United States Patent Office 3,082,078
Patented Mar. 19, 1963

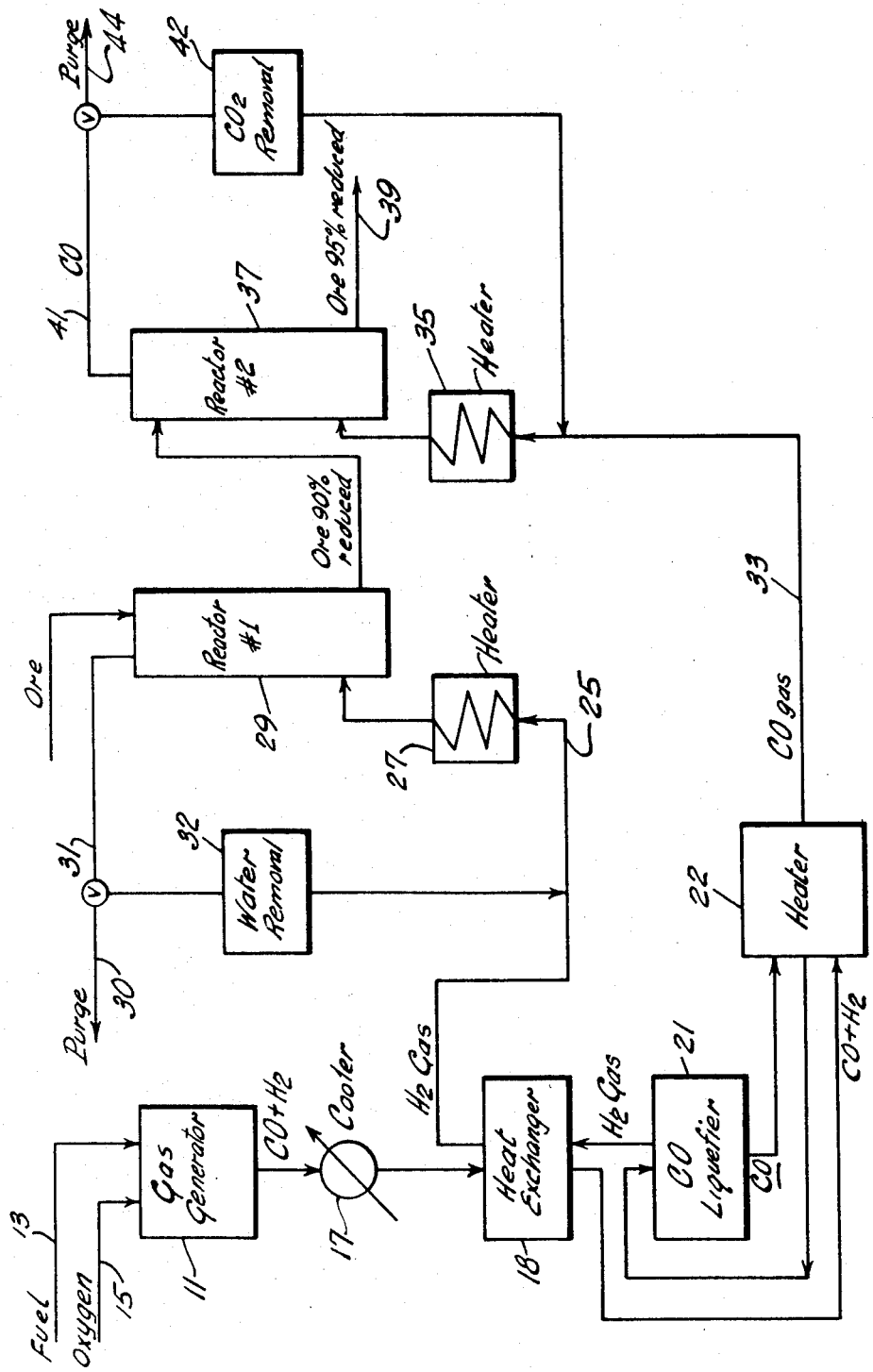

3,082,078
TWO-STAGE ORE REDUCTION
Peter L. Paull, Weston, Conn., assignor to Texaco Development Corporation, New York, N.Y., a corporation of Delaware
Filed Oct. 9, 1959, Ser. No. 845,417
2 Claims. (Cl. 75—34)

The present invention relates to a novel process for reducing reducible metal oxides, for example oxidic ores such as iron ore, by a two-stage operation involving reduction with hydrogen in the first stage, followed by reduction with carbon monoxide in the second stage. In the preferred type of operation, the hydrogen and carbon monoxide are generated simultaneously by the partial oxidation of a carbonaceous fuel in a gas generator, subsequently being separated from one another and then used in ore reduction.

The single FIGURE of the drawing is a schematic flow diagram showing an arrangement of apparatus for generating carbon monoxide and hydrogen gases, and separately feeding them to the two stages of an ore reduction operation.

Referring to the drawing, a gas generator 11 of the type described in U.S. Patent 2,582,938 issued January 15, 1952, to du Bois Eastman and Leon Gaucher is fed with a carbonaceous fuel such as natural gas or petroleum oil by a line 13. Oxygen in air or a more concentrated form is fed by a line 15 into the generator, the quantity of oxygen being in excess of the quantity theoretically for conversion of all carbon in the feed to CO but less than the quantity theoretically for $CO_2$. The two react with one another under suitable temperature and pressure conditions, as described in the patent, to produce a product gas which is mainly a mixture of carbon monoxide and hydrogen, when the fuel is a liquid, steam also is fed to the reaction zone. Gas generation ordinarily proceeds at temperatures between 2250 and 3000° F. and pressures between 200 and 500 p.s.i.g.

The hot mixture of carbon monoxide and hydrogen then passes through a cooler 17, a heat exchanger 18 wherein it is cooled, and to a liquefaction apparatus 21 wherein it is cooled, compressed and converted to a mixture of liquid carbon monoxide and gaseous hydrogen. The undesired $CO_2$ at the same time is solidified and remains in the liquefier, from which it may be removed periodically.

Hydrogen gas leaves the top through a line 25, passes through heat exchanger 18 for preheating the hydrogen, enters a direct fired heater 27 wherein its temperature is raised sufficiently to bring about the subsequent ore reduction reaction, and then passes into a reduction column 29 near the bottom to flow upwardly through a downwardly descending body of oxidic ore which has been introduced at the top of the column. The off gas from the top of column 29, containing residual hydrogen, is recycled by a line 31 through water removal apparatus 32 and back to the hydrogen line 25 upstream of heater 27, so as to conserve as much of the unreacted hydrogen as possible. Off gas also may be purged from the system as necessary through a line 30.

Liquid carbon monoxide substantially free of hydrogen leaves the bottom of liquefier 21 and passes through a heater 22 wherein the CO is gasified. Advantageously the CO is gasified by heating it with warm gas from generator 11. Then the CO gas passes through a line 33 to a direct fired heater 35 wherein its temperature is raised sufficiently to reduce oxidic ore in a second column 37. The latter is supplied with partially reduced ore from column 29 (e.g. 90% metal) so that at least part of the remaining oxides react with the carbon monoxide and are reduced to such an extent that the product leaving column 37 at 39 is predominantly metallic (e.g. 95% metal).

Gas leaving the top of column 37 through line 41 is recycled through $CO_2$ removal apparatus 42 and back to line 33 upstream of heater 35 to conserve unreacted carbon monoxide. Off gas also may be purged from the system as necessary through a line 44.

The process described above is particularly advantageous because a more complete reduction is possible than when the hydrogen and carbon monoxide are fed together into a reduction column. This is because the water vapor always formed when hydrogen reacts with metallic oxides tends to affect the equilibrium of the operation in such a way that the carbon monoxide does not exert its greatest reducing effect. On the other hand, when the reduction is operated in two stages, as described, the reaction of carbon monoxide with partially reduced ore is accomplished in the absence of any substantial amount of water vapor so that a more complete reduction is possible.

The ore is fed to the reduction column 29 as moderately fine particles such as —4 +60 mesh U.S. standard. Reduction also can take place with the ore in a fluidized bed if desired.

While the reduction of iron ore has been referred to above, it should be understood that the principles of the invention apply also to the reduction of other reducible oxidic ores, or to metal oxides which are not necessarily ores. The reduction temperatures vary for different metal oxides, representative temperatures being stated in Table I below.

The top temperature should be below the melting point of the metal when metal powder is wanted, since molten metal would be produced above the melting point.

TABLE I

| Oxides of— | Reduction temperature, ° C. | |
|---|---|---|
| | With CO | With $H_2$ |
| Copper | 130 | 140 |
| Zinc | 400 | 450 |
| Lead | 100 | 185 |
| Cadmium | 250 | 280 |
| Iron | 350 | 500-600 |
| Nickel | 300 | 300 |
| Cobalt | 600 | 500-600 (starts 165) |

*Example*

In an illustrative embodiment of the invention, natural gas containing 94.3% methane at the rate of 1,116,000 standard cubic feet per day is preheated to 1,000° F. and reacted with 800,000 cubic feet per day of 99% purity oxygen, preheated to 300° F., in synthesis gas generator 11, to produce a synthesis gas stream of the following compositions:

| | Mol. percent |
|---|---|
| CO | 32.27 |
| $H_2$ | 56.39 |
| $CO_2$ | 1.65 |
| $H_2O$ | 9.00 |
| $CH_4$ | 0.34 |
| A | 0.11 |
| $N_2$ | 0.24 |
| Total | 100.00 |

This gas is subjected to cooling in a condenser 17 to condense and remove water, then passed to a liquefier and separator zone 21 to solidify the $CO_2$ and liquefy the CO. The condensed water, equivalent to 320,000 cubic feet per day, is discharged from the condenser 17. The solidified $CO_2$ is revaporized in the liquefier-separator 21 with a warm purge stream and discarded from the system along with the purge as a second stream. The small traces of methane, argon and nitrogen present in the synthesis gas are liquefied along with the CO, so that they may be separated from the remaining gaseous hydrogen. After separation, the CO, argon and nitrogen are re-evaporated by suitable exchange with the incoming synthesis gas feed to the liquefier-separator 21, and directed, in the amount of 1,190,000 standard cubic feet per day, to heater 35 wherein the temperature is raised to 1500° F.

The gaseous hydrogen is also reheated by exchange with the incoming feed to the liquefier-separator and is directed to heater 27 in the amount of 2,030,000 standard cubic feet per day.

The hydrogen passes through heater 27 where its temperature is raised to 1450° F. and then enters column 29 and passes upwardly through a mass of iron ore comprising hematite from the Mesabi Range, containing 95% magnetite and 5% impurities, principally silica, which is supplied to the top of column 29 at the rate of 100 tons per day.

The magnetite content of the ore is approximately 90% reduced to metallic iron in column 29, from which it is removed at the bottom and passed to the top of column 37 which is charged with the carbon monoxide stream through line 33 at a temperature of 1500° F. The ore and the carbon monoxide flow countercurrently to one another and a reduced ore product of the following composition is removed at 39 at the rate of 72 tons per day:

|  | Weight percent |
|---|---|
| Fe | 91.0 |
| Unconverted magnetite | 2.0 |
| Impurities | 7.0 |

The gases passing overhead from towers 92 and 37 through lines 31 and 41, respectively, are recycled after removal of water and $CO_2$ therefrom, back to heaters 27 and 35 and reintroduced along with the fresh hydrogen and CO streams, to the reduction columns. The hydrogen is recycled at a rate of 10 parts of recycle gas to 1 part of fresh feed gas, with sufficient gas being purged from line 31 through line 30 so as to maintain this recycle ratio. Similarly, the CO stream is recycled in the ratio of 5 parts of recycle gas to 1 part of fresh feed gas, with gas purging from line 41 through line 44 serving to maintain this recycle ratio.

Obviously, many modifications and variations of the invention, as hereinbefore set forth, may be made without departing from the spirit and scope thereof, and therefore only such limitations should be imposed as are indicated in the appended claims.

I claim:

1. A process for the reduction of iron ore which comprises contacting a moving bed of said iron ore having a mesh size of from about 4 to 60 with hydrogen heated to a temperature of about 1450° F. in a first reduction zone, thereby effecting partial reduction of said iron ore; passing said partially reduced iron ore into a separate second reduction zone; passing carbon monoxide heated to a temperature of about 1500° F. in contact therewith in said second zone in the absence of any substantial amount of water vapor, thereby further reducing the residual ore content thereof; said reducing gases in both of said reduction zones moving counter-currently with respect to said moving bed of iron ore; and recovering the resulting reduced iron as product from the second zone.

2. A process for the reduction of iron ore which comprises generating a mixture of carbon monoxide and hydrogen by the partial oxidation of a carbonaceous fuel; separating said carbon monoxide and hydrogen from one another; preheating the resulting hydrogen to a temperature of about 1450° F.; passing the hydrogen so preheated into a first reduction zone into contact with particles of said iron ore, thereby effecting partial reduction of said iron ore; passing the partially reduced iron ore from said first reduction zone into a separate second reduction zone; preheating said carbon monoxide to a temperature of about 1500° F.; passing the carbon monoxide so preheated into said second reduction zone into contact with said partially reduced iron ore, thereby further reducing the residual ore content thereof; and recovering the resulting iron as product from said second reduction zone.

References Cited in the file of this patent

Chemical Abstracts, vol. 34, 1940, column 6903–6906.